United States Patent

[11] 3,624,555

[72] Inventor Carl F. Klein
Milwaukee, Wis.
[21] Appl. No. 15,478
[22] Filed Mar. 2, 1970
[45] Patented Nov. 30, 1971
[73] Assignee Johnson Service Company
Milwaukee, Wis.

[54] MICROWAVE CAVITY OSCILLATOR

17 Claims, 3 Drawing Figs.

[52] U.S. Cl. 331/107 R, 331/96, 333/83 R
[51] Int. Cl. H03b 7/12
[50] Field of Search 331/107, 108, 117 D, 96, 97, 101; 333/83

[56] References Cited

UNITED STATES PATENTS

| | | | |
|---|---|---|---|
| 3,311,839 | 3/1967 | Rutulis | 333/83 |
| 3,401,355 | 9/1968 | Kafitz | 331/107 |
| 3,416,098 | 12/1968 | Vane | 331/101 |
| 3,443,244 | 5/1969 | Cook | 331/96 |
| 3,474,351 | 10/1969 | Cook et al. | 331/107 |

FOREIGN PATENTS

| | | | |
|---|---|---|---|
| 1,006,346 | 9/1965 | Great Britain | 331/96 |

*Primary Examiner*—John Kominski
*Attorneys*—Andrus, Sceales, Starke & Sawall and Arnold J. De Angelis

ABSTRACT: A microwave cavity oscillator includes a cavity block of a suitable metal having a cavity in one wall. A microwave diode is secured to the closed end of the open-ended cavity with a tubular center conductor secured to the diode. A dielectric tuning element of "Rexolite" is mounted for axial adjustment within the open end of the cavity. The element provides a direct capacitive coupling of the open-ended cavity to the center conductor to change cavity impedance and the frequency without loading the cavity with the consequent losses. A bias wire is connected to the center conductor and extends laterally through an opening to a bias disc within a recess. A dielectric plate is placed between the disc and recess base. A bias pin is carried by a dielectric member within a bias plug which threads into the recess. The pin bears on the back of the disc to clamp the dielectric plane and element against the base recess. The diode package defines a current-dividing network around the diode permitting adjustment of the circulating current through the diode.

INVENTOR.
Carl F. Klein

BY
Andrus, Sceales, Starke & Sawall

Attorneys

MICROWAVE CAVITY OSCILLATOR

BACKGROUND OF THE INVENTION

This invention relates to a solid-state microwave oscillator and particularly to a solid-state fundamental frequency cavity oscillator.

The generation and transmission of microwave energy is of substantial commercial significance in connection with the various communication and data transmission applications. Microwave power has been generated by many different devices. Vacuum tube and transistor oscillator multipliers, varactor diode harmonic generators, and waveguide and coaxial cavity fundamental frequency oscillators in various configurations have been developed. Vacuum tube devices have a relatively limited lifetime because of burnout of the necessary heating filaments and the like. Solid-state microwave power generators such as the transistorized and solid-state diode devices have a relatively long life and are, therefore, advantageously employed. The transistor oscillator multipliers and the like, however, generally require separate microwave circuitry in combination with the basic oscillator circuitry. Such devices, therefore, tend to be relatively large in size as well as relatively complex and costly. Although waveguide and coaxial cavity oscillating devices may be employed to eliminate some of the disadvantages of the other forms of devices, they generally have a relatively low Q and low yield factors. The Q factor of a waveguide or coaxial cavity is a measure of its frequency selectivity and is related to the relative energy stored in the cavity field and the power loss. Although the waveguide or coaxial cavity can be designed with a relatively high Q, the Q factor is normally substantially reduced when they are incorporated into a microwave oscillator to permit diode cavity impedance matching. In a waveguide, for example, the height of a waveguide is generally reduced to permit mounting of the solid-state diode across the waveguide. This, however, reduces the waveguide's characteristic impedance and its Q factor. Similarly, in coaxial cavities, the geometry is such that a high characteristic impedance and a high Q factor cannot be obtained. The diode is tightly coupled to the resonator and the cavity impedance cannot be altered significantly and still maintain the necessary conjugate impedance which is required for oscillation in cavity oscillators. Such devices have had a relatively limited tuning range. Coaxial cavity oscillators are tuned with an adjustable coaxial metal conductor secured in the open end of the cavity. The tuning conductor varies the load impedance and consequently the frequency. The tuning conductor, however, introduces relatively high losses and reduces the Q factor.

The result is that, generally, present day microwave oscillators and power generators are relatively complex with the resulting difficulty and expense in initial construction as well as subsequent maintenance.

SUMMARY OF INVENTION

The present invention is particularly directed to a solid-state microwave cavity oscillator which provides a high Q factor over a broad tuning band as well as a high yield factor. The output power and frequency are maintained constant at a selected level over relatively wide variations in environmental temperature and changes in load impedance. The cavity oscillator of the present invention also provides in its optimum construction a highly efficient microwave source which has a low amplitude and frequency modulation noise characteristic and a highly improved radio frequency bypassing circuitry. The solid-state microwave oscillator of the invention is also relatively inexpensive to construct, assemble, manufacture and maintain.

Generally, in accordance with the present invention, a high-frequency solid-state diode element is secured to the closed end of an open-ended cavity, the opposite end of which is provided with a low-loss dielectric tuning element. The tuning element is mounted for axial adjustment within the cavity and changes the frequency of the cavity oscillator. Applicant has found that the use of a dielectric tuning means, in contrast to the conventional metallic elements, results in a significantly improved result. It would appear that the dielectric element provides a direct capacitive coupling of the open-ended cavity to the center conductor and that the changing of the relative position thereof acts as a variable capacitive coupling. The dielectric material thus changes the impedance of the cavity but does not actually load down the cavity with the consequent losses. As a result, the losses in the present invention are essentially constant with broadband tuning and only the frequency varies.

More particularly, the diode is mounted within the one end of a cavity with a metallic cavity housing preferably a metallic block. A coaxial center conductor in the form of a hollow conductor is connected to the diode. The one end of the center conductor is preferably formed as a collet and connected to the diode by a press fit. The center conductor determines the effective length of the coaxial transmission line and permits matching the cavity's reactive impedance component to that of the diode, in accordance with the usual diode cavity oscillator construction. The length of the center conductor is generally related to the relative geometry of the cavity, the center conductor and the low-loss dielectric tuning member.

In the present invention, the diode is coupled to the cavity with a paralleled current-dividing network built around the diode to permit adjustment of a circulating current through the diode. The current-divider network is built into the packaging of the diode with the center conductor and interconnected cavity body establishing a shunting capacitance with respect to the open end of the cavity. A small inductance is connected in series with the diode impedance and the diode can thus be considered coupled to the cavity by an impedance transformer. This permits matching of the diode characteristic to the high Q characteristic of the cavity.

In a preferred construction, the diode bias is provided through a diode bias network mounted as a unit in a recess in the side of the cavity block. A bias wire is connected to the center conductor, a bias disc or plate element adjacent the bias of the recess and separated from the cavity block by a dielectric element. A bias plus is releasably secured in the recess and carries a bias connector which abuts the disc to provide the input bias current and voltage connection. The bias wire includes at least one partial or complete loop or turn and introduces a small external impedance into the oscillator for radio frequency (RF) choking. The dielectric element between the bias disc and the cavity housing forms a bypass or shunt capacitance which is also connected to the diode hat through this bias wire. RF signal bypassing is further established by the formation of a large bypass capacitor as a result of the insulating dielectric medium between the bias pin and the wall of the recess.

In assembly, the diode is secured within the base of the cavity block to provide a firm physical mounting of the diode with minimal thermal impedance. Low thermal impedance between the diode and the cavity housing may be obtained through the usual threaded connection or, in the case of a studded pill-type package, a tapered collet configuration with a clamping pressure plug may advantageously be employed. The coaxial center conductor is supported by the bias wire and is press fitted or otherwise firmly interconnected to the diode after the diode has been properly mounted within the cavity. The bias plug assembly is then assembled within the side recess to complete the unit.

The output of the cavity is preferably coupled through an iris or opening and an impedance transformer with an aperture tuning screw to match the cavity and load losses to the generator impedance such that maximum power transfer is obtained.

The present invention thus provides a solid-state microwave oscillator of a waveguide and coaxial cavity construction which provides a high Q cavity in combination with frequency tuning over a relatively wide range while maintaining very stable and sensitive operation of the oscillator. Furthermore, the oscillator is relatively simple to construct, assemble, manufacture and maintain at a minimum cost and, therefore, it is particularly adapted to mass production and the like.

BRIEF DESCRIPTION OF DRAWING

The drawing furnished herewith illustrates the best mode presently contemplated by the inventor for carrying out the subject invention in which the above advantages and features are clearly disclosed as well as others.

In the drawing.

DESCRIPTION OF ILLUSTRATED EMBODIMENT

Figure 1:
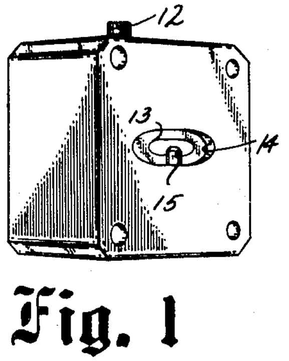
FIG. 1 is a pictorial view of a solid-state microwave oscillator constructed in accordance with the present invention.
Figure 3:
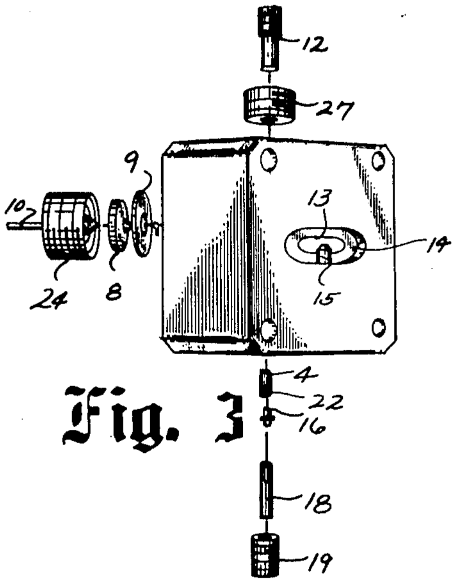
FIG. 3 is an exploded view more clearly showing details of construction of the embodiment shown in FIGS. 1 and 2.
Figure 2:
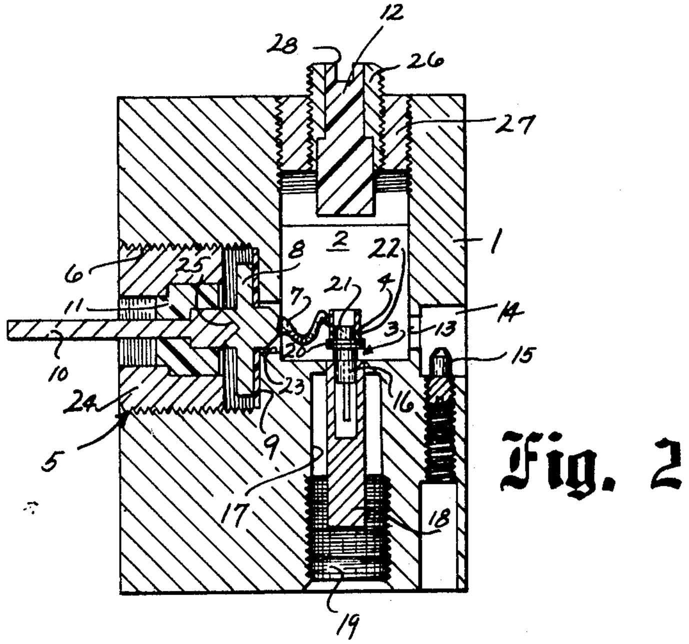
FIG. 2 is a vertical section through the microwave diode oscillator shown in FIG. 1 showing the details of construction in accordance with the present invention.

The illustrated microwave oscillator includes a generally rectangular cavity block 1 with an open ended oscillator cylindrical cavity 2 formed extending inwardly from the one end. a diode unit 3 is mounted in the closed end of the cavity 2 with coaxial center conductor 4 connected to the diode and projecting coaxially outwardly therefrom. The length of the coaxial center conductor 4 is selected such that its reactive impedance at the outer end complements the negative impedance characteristic of the particular solid-state diode unit 3, generally in accordance with known selection to produce oscillation. In accordance with the present invention, bias voltage and current is supplied to the diode unit 3 through a special bias and bypass network assembly 5 mounted within a recess 6 in a wall of the rectangular block 1, shown to the left side of the structure in FIG. 2. Generally, the assembly 5 includes a bias conductor 7 interconnected between the coaxial conductor 4 and an input bias metal disc 8 and formed with a loop to form an inductive choke. A capacitive dielectric medium and element 9 separates and isolates the disc 8 from the cavity block 1. The disc 8 and capacitive element 9 are clamped in position by a bias plug unit having a center bias pin 10 carried by an insulating element 11 to insulate the bias pin from the cavity.

The frequency of the microwave oscillator is controlled in accordance with the present invention by a special tuning rod or element 12 selectively positioned in the open end of the cavity 2. The tuning element 12 is axially adjustable within the cavity and, in accordance with a particularly important aspect and novel teaching of the present invention, is formed of a low-loss, dielectric material. Applicant has found that polystyrene sold under the trademark "Rexolite" gives unusually satisfactory results. The low-loss, dielectric material changes the coaxial center conductors' fringing capacitance at the open end of the cavity by changing its dielectric constant. The degree of coupling is thus adjusted and controlled by the relative axial position of the dielectric control element 12. This is in contrast to the impedance-type loading or the loading of the cavity 2 in accordance with prior art teaching to control the frequency.

The output of the microwave oscillator is provided through a small iris or opening 13 and a coupling impedance transformer 14 formed in an exterior wall of rectangular cavity block 1 to the opposite side of the block from that of the bias network recess 6. A small tuning rod 15 may be mounted for selective lateral projection into the transformer cavity to permit adjustment of the input coupling. Thus, it is desired to match the cavity and load losses to the generator's impedance to establish or optimize power transfer.

More particularly, in the illustrated embodiment of the invention, the cavity block is shown as a suitable solid metallic conductor. The diode unit 3 is shown as a studded pill-type unit having an outwardly projecting mounting stud 16.

The cavity body is provided with a collet opening 17 in coaxial alignment with the cavity 2 into which the mounting stud 16 projects. The opening between the cavities is larger than the mounted stud 16 and a tapered collet 18 clamps over the mounting stud 16. A pressure plug 19 threads into a correspondingly threaded portion of the outer end of the collet opening 17 to firmly force the collet 18 to firmly collapse the collet 18 and thereby support the collet 18 and the diode unit 3 in firm heat-exchange relationship with the cavity block.

The illustrated diode unit 3 includes a central flange 20 portion which connects to the diode stud 21 projecting coaxially into the cavity 2. The coaxial center conductor 4 is a tubular member, the inner end of which is also formed with a plurality of axial slits or the like to define a collet 22 which is press fitted over the outer projecting casing of the diode 21. Applicant has found the collet provides a firm, physical support as well as an excellent electrical interconnection therebetween.

The bias conductor 7 is a small lead wire welded or integrally formed to the coaxial center conductor 4 and extends laterally therefrom in a single loop with the outer end interconnected to the bias network and particularly the bias disc 8.

Thus, in the illustrated embodiment of the invention, the recess 6 for the network is shown as a relatively large opening extending inwardly from the side of the block 1 and interconnected to the cavity 2 through a small opening 23 adjacent the base of the cavity 2. The bias disc 8 includes a center body portion generally somewhat smaller than the size of the coupling opening 23 and an outer encircling flange which extends outwardly overlapping the base of the network recess 6. The inner end of the bias disc body portion generally terminates in a pointed construction with the bias lead 7 positively interconnected thereto to form an excellent electrical and physical interconnection, generally in the plane of the wall of the cavity 2.

The bias plus unit includes an annular outer member 24 threaded into the outer end of the recess 6. The bias pin 10 is centrally mounted within an opening in the annular member 24 by the element 11 formed of a suitable dielectric material. The element 11 supports the bias pin 10 in insulated relationship to the annular bias member 24 and the cavity wall. The inner end of the bias pin 10 is provided with a chamfered or pointed head mating with and engaging a corresponding recess in the backside of the bias disc 8 as at 25. The inward threading of the bias plug member 24 forces the bias pin 10 into engagement with the backside of the bias disc 8 forcing it forward into firm clamping engagement with the dielectric material element 9 and, in turn, the base of the recess 6. This provides a positive electrical interconnection between the bias disc 8 and the bias pin 10 and also firmly clamps the dielectric element 9 between the wall of recess 6 in the flange of the bias disc 8. The dielectric material 9 produces a small external impedance into the oscillator circuit and the bias wire 7 functions as an RF choke, as well as supplying voltage and current from the bias pin 10 to the center conductor 4 and the diode unit 3.

The insulating dielectric support 11 establishes a relatively large capacitor to bypass radio frequency from the bias network.

In a construction of the device, the solid-state diode unit 3 is suitably mounted within the base of the cavity 2. The biasing assembly is attached to the cavity with the coaxial center conductor 4 supported by the small bias wire 7. Once the diode unit 3 has been mounted in the cavity, the coaxial center conductor 4 is pressed onto the diode with an excellent press fit obtained as a result of the collet 22.

The tuning element 12 is a generally rod-shaped member with a threaded metal collar 26 secured to the outer end thereof. The element 12 is threaded into a cavity plug 27 which, in turn, is threaded into the outermost end of the cavity 2. The outer end of the tuning element 12 is shown provided with a slot 28 to accept a screwdriver or the like to permit threaded adjustment of the tuning element 12 with respect to the plug and thereby providing for the coaxial or axial adjustment with respect to the diode.

The element, as previously noted, is formed of a good dielectric material having a minimum dissipation factor in the microwave frequency range. Applicant has found that unusually satisfactory results are obtained by the use of a polystyrene material sold under the trademark "Rexolite." The material has a dissipation factor on the order of 0.00048 at a frequency of 10 gigacycles. The "Rexolite" rod or any similar element changes the capacitive impedance at the open end of the oscillator cavity and essentially introduces a minimal or no-loss loading of the cavity. The result is that the axial position of the element 12 tunes the frequency of the cavity without loss loading of the cavity as in the conventional device which employs a conductive tuning element. The tuning element 12, as previously noted, may be any suitable dielectric material having a minimal dissipation factor at microwave frequencies. Generally, the dissipation factor should not be greater than of the order of 0.1. Further, if the dissipation factor is in excess of 0.01 as a result of a dielectric such as nylon, the power rapidly drops off as a result of the increased losses. The approach of the present invention allows broadband frequency tuning with a relatively constant output power.

The microwave power is transferred to the load through the coupling structure including the iris or opening 15 immediately adjacent the base of the cavity 2. The impedance transformer 15 is formed as a recess in the wall of the cavity extending laterally from the coupling iris 13. The tuning screw or rod 15 is shown as a small metal rod threaded into an opening extending normal to the transformer recess 15. The position of the coupling rod 15 into the transformer cavity varies the coupling and permits adjustment to a value where the combined cavity and load losses are matched to the impedance of the generator.

The impedance of the cavity and its related resonant frequency are generally determined by the ratio of the diameter of the cavity to the diameter of the center conductor, the length of the center conductor as well as the actual positioning of the tuning rod. Thus, in the construction of the device, a basic frequency can be established by the proper selection of the length of the central conductor with respect to the negative impedance diode unit 3. The tuning rod or element 12 is then adjusted to provide the desired tuning to a particular frequency.

Applicant has found that the present oscillator can be readily constructed with a Q factor of approximately 3,000 at a frequency of 9 to 12 gigacycles. This is in contrast to presently known solid state oscillators which have rather substantially smaller Q's, normally less than 100, when operated at a corresponding frequency. Further, the operating frequency can be varied readily over a range of at least 2 GHz without appreciable reduction in the output power. Further, the load impedance can vary substantially without any significant change in the output frequency.

The present invention thus provides a highly improved solid-state microwave frequency diode oscillator which is conveniently adapted to production with a minimum expense of construction and manufacture and subsequent maintenance. The device provides a waveguide coaxial cavity fundamental oscillator which can be constructed to have the desirable high characteristic impedance and Q factors with diode and cavity impedance matching.

Various modes of carrying out the invention are contemplated as being within the scope of the following claims which particularly point out and distinctly claim the subject matter which is regarded as the invention.

I claim:

1. A solid-state microwave cavity oscillator for generating microwave energy, a microwave cavity housing having an open-ended cavity, a microwave diode element secured in the lower end of the cavity, a center coaxial conductor connected to said diode and projecting outwardly of said cavity and terminating within said cavity, and a dielectric tuning element mounted in the open end of said cavity in spaced, coupled relationship to said conductor and changing the capacitive impedance of the open end of said cavity to control the frequency of the oscillator without loading the cavity.

2. The solid-state microwave cavity oscillator of claim 1 wherein said tuning element is formed of a material having a dissipation factor of less than 0.1 at 10 gigacycles.

3. The solid-state microwave cavity oscillator of claim 1 wherein said tuning element is formed of a polystyrene rod having a dissipation factor of the order of 0.00048 at 10 gigacycles.

4. The solid-state microwave cavity oscillator of claim 1 having a direct current input bias network secured to the housing and including a bias conductor connected to said center coaxial conductor and having capacitive and inductive impedances to establish a radio frequency choke and radio frequency bypass elements and to adjust diode coupling to the circulating current of the oscillator.

5. The solid-state microwave cavity oscillator of claim 4 wherein said bias conductor includes a loop to define the radio frequency choke.

6. The solid state microwave cavity oscillator of claim 4 having a bias conducting member connected to said bias conductor, and wherein said capacitive impedances include a dielectric material disposed between said housing and said bias conducting member exterior of said cavity.

7. The solid-state microwave cavity oscillator of claim 1, wherein said housing is a metal block member having said open-ended cavity formed in one wall, said microwave diode element being attached to the lower end wall of the cavity, said center conductor being a tubular conductor telescoped over the end of said diode, and said dielectric tuning element being mounted in spaced alignment to said center conductor.

8. The solid-state microwave cavity oscillator of claim 1 wherein said housing is a metal block having said cavity formed in one wall, said block having a recess in an adjacent wall connected to said cavity by a small opening, a bias conductor connected to said center conductor, a bias contact element mounted in the recess and in spaced relation to the base of the recess and connected to said bias conductor, said center conductor being formed in a loop to insert an inductive impedance in the bias circuit, a dielectric disposed within the space between said element and said wall to establish a capacitive shunt impedance, an input bias element coupled to said contact element and extending outwardly through the recess, and a large dielectric member interposed between the input bias element and the sidewall of the recess to establish a radio frequency bypass in the bias network.

9. The solid-state microwave cavity oscillator of claim 1 having an input bias network including a bias conductor defining a radio frequency choke means connected to said center conductor and to a bias contact element, said contact element being mounted in spaced re relation to the cavity wall, a dielectric disposed within the space between said element and said wall to establish a capacitive shunt impedance in the oscillator, and a large dielectric member interposed between the contact element and the cavity body to establish a radio frequency bypass in the bias network.

10. The solid-state microwave cavity oscillator of claim 1 including a bias network mounted within the housing and including a bias conductor connected to the center conductor, said housing being conductive, a bias disc element disposed within the housing and connected to said bias conductor, a dielectric disposed between the bias disc element and the housing, a bias conducting pin connected to said disc element, and a dielectric member secured to the pin and the housing.

11. The solid-state microwave cavity oscillator of claim 1 wherein said housing is a conductive block having said cavity extending inwardly from an outer wall and terminating in a flat inner end wall, said diode being in thermal and electrical connection to said end wall and projecting axially into the cavity, said center conductor being a tubular member having the one end formed as a collet and press fitted to the outer end of the diode and being in electrical connection thereto, the outer end of said cavity being threaded, a support plug threaded into the outer end of said cavity, said tuning element being a dielectric element with an outer thread portion threaded into the support plug for axial adjustment with respect to said center conductor, a bias conductor connected to the side of the center conductor and extended laterally therefrom, said cavity block having a bias network recess to the one side of the cavity and connected thereto by an opening in alignment with said bias conductor, and a bias and circuit impedance in said recess connected to each other and to said bias conductor and including capacitive and inductive impedances to establish a circulating current control dividing network and thereby vary the diode coupling to the circulating current.

12. The solid-state microwave cavity oscillator of claim 1 wherein said housing is a conductive block having said cavity terminating in a flat inner end wall, said diode element being in thermal and electrical connection to said end wall and projecting axially into the cavity, a support plug secured in the outer end of said cavity, said tuning element being a dielectric element with an outer thread portion threaded into the support plug for axial adjustment with respect to said center conductor, a bias conductor connected to the side of the center conductor and extended laterally therefrom with at least one convolution, an opening in alignment with said bias conductor, a bias disc disposed outwardly of the opening and connected to said bias conductor, a dielectric element disposed between the bias disc and the block, a clamping bias unit having a support member releasably secured to the block with an inner conductive pin connected to said support member by an interposed dielectric member, and the inner end of said conductive bias pin engaging the outer end of said bias disc and positioned to firmly clamp said bias disc and said first dielectric element against said conductive block to establish an electrical connection to the bias disc upon inward positioning of the plug.

13. The solid-state microwave cavity oscillator of claim 1 wherein said housing is a conductive block having said cavity extending inwardly from an outer wall and terminating in a flat inner end wall, said diode element being in thermal and electrical connection to said end wall and projecting axially into the cavity, said center conductor being a tubular member having the one end formed as a collet and press fitted to the outer end of the diode and being in electrical connection thereto, the outer end of said cavity being threaded, a support plug threaded into the outer end of said cavity, said tuning element being a dielectric element with an outer thread portion threaded into the support plug for axial adjustment with respect to said center conductor, a bias conductor connected to the side of the center conductor and extended laterally therefrom with at least one convolution, said cavity block having a bias network recess to the one side of the cavity and connected thereto by an opening in alignment with said bias conductor, a bias disc disposed within the bottom of said recess with a center body portion protruding through the opening to a pointed end integrally connected to said bias conductor in the plane of the cavity wall, a dielectric disposed between the bias disc and the bottom of said recess, a clamping bias plug unit having an annular threaded portion threaded into the recess and an inner conductive pin connected to said annular threaded portion by an interposed dielectric member, and the inner end of said bias pin engaging the outer end of said bias disc to clamp said bias disc and first dielectric element to the base of the recess and to establish an electrical connection to the bias disc upon inward positioning of the plug.

14. The solid-state microwave cavity oscillator of claim 13 having an output iris adjacent the base of the cavity, an output impedance transformer cavity extending from said output iris, and a conductive tuning screw threaded into the wall of the transformer cavity adjacent the iris to vary the output coupling.

15. The solid-state microwave oscillator of claim 1 having an output coupling means including a coupling opening in the sidewall of the cavity and an impedance transformer cavity extending from said coupling opening, and an output coupling element mounted to project into the transformer cavity in overlying relationship to the coupling opening to vary the output coupling.

16. A solid-state microwave cavity oscillator, a microwave cavity housing having an open-ended cavity, a microwave diode element mounted in the lower end of the cavity, a center conductor connected to said diode, said diode element being coupled to the cavity by an impedance transformer means, an output coupling means including a coupling opening in the sidewall of the cavity and an impedance transformer cavity extending from said coupling opening, and an output coupling control element mounted to project into the transformer cavity in overlying relationship to the coupling opening to vary the output coupling.

17. The solid-state microwave cavity oscillator of claim 16 having a dielectric tuning element mounted in the open end of said cavity.

* * * * *